US010603613B2

(12) United States Patent
Dhiman

(10) Patent No.: US 10,603,613 B2
(45) Date of Patent: Mar. 31, 2020

(54) INSTALLATION OF CORRECT FILTER CARTRIDGE IN FLUID FILTER ASSEMBLY BEFORE ALLOWING ASSEMBLY TO BE COMPLETED

(71) Applicant: Cummins Filtration IP, Inc., Columbus, IN (US)

(72) Inventor: Rajeev Dhiman, Pune (IN)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

(21) Appl. No.: 16/002,478

(22) Filed: Jun. 7, 2018

(65) Prior Publication Data

US 2018/0290084 A1 Oct. 11, 2018

Related U.S. Application Data

(63) Continuation of application No. 14/368,945, filed as application No. PCT/IB2013/051441 on Feb. 22, 2013, now Pat. No. 10,016,711.

(30) Foreign Application Priority Data

Feb. 22, 2012 (IN) .......................... 487/MUM/2012

(51) Int. Cl.
| | |
|---|---|
| *B01D 35/30* | (2006.01) |
| *B01D 35/153* | (2006.01) |
| *B01D 36/00* | (2006.01) |
| *B01D 29/96* | (2006.01) |

(52) U.S. Cl.
CPC ........... *B01D 35/306* (2013.01); *B01D 29/96* (2013.01); *B01D 35/153* (2013.01); *B01D 35/30* (2013.01); *B01D 36/005* (2013.01); *B01D 2201/4053* (2013.01); *Y10T 29/49826* (2015.01)

(58) Field of Classification Search
CPC .... B01D 35/306; B01D 35/30; B01D 35/153; B01D 36/005; B01D 29/96; B01D 29/49826
USPC ........................................................ 210/232
See application file for complete search history.

(56) References Cited

U.S. PATENT DOCUMENTS

| | | | |
|---|---|---|---|
| 5,080,787 A | 1/1992 | Brown et al. | |
| 5,308,369 A | 5/1994 | Morton et al. | |
| 7,237,682 B2 * | 7/2007 | Reynolds | B01D 29/21 210/450 |
| 7,615,151 B2 | 11/2009 | Wieczorek et al. | |

(Continued)

OTHER PUBLICATIONS

International Search Report and Written Opinion for PCT/IB/2013/051441, dated Aug. 8, 2013, 9 pages.

*Primary Examiner* — Thomas M Lithgow
(74) *Attorney, Agent, or Firm* — Foley & Lardner LLP

(57) ABSTRACT

The descriptions relate to preventing assembly of a fluid filter apparatus unless a filter cartridge is installed, and preventing assembly of a fluid filter apparatus if the incorrect filter cartridge is installed. A mechanism includes cooperation of a movable member and a structure that can move the movable member to ensure that a fluid filter apparatus cannot be completely assembled, for example connecting its filter head to its shell, when there is no cartridge installed inside the shell or when there is an attempt to install an incorrect cartridge. This can protect from an inadvertent or intentional failure to install a cartridge (or correct cartridge) in the fluid filter apparatus.

10 Claims, 6 Drawing Sheets

(56) References Cited

U.S. PATENT DOCUMENTS

| | | |
|---|---|---|
| 7,638,046 B2 | 12/2009 | Treyz |
| 9,199,187 B2 | 12/2015 | Honermann et al. |
| 2004/0020836 A1 | 2/2004 | Bozenmayer |
| 2004/0069700 A1 | 4/2004 | Miller et al. |
| 2008/0142426 A1* | 6/2008 | Greco .................. B01D 35/143 |
| | | 210/234 |
| 2010/0044295 A1 | 2/2010 | Honermann et al. |
| 2011/0073538 A1 | 3/2011 | Jiang et al. |
| 2011/0100893 A1 | 5/2011 | Kocksch et al. |

* cited by examiner

INSTALLATION OF CORRECT FILTER CARTRIDGE IN FLUID FILTER ASSEMBLY BEFORE ALLOWING ASSEMBLY TO BE COMPLETED

CROSS REFERENCE TO RELATED APPLICATIONS

The present application is a continuation of U.S. patent application Ser. No. 14/368,945, filed Jun. 26, 2014, which is a U.S. National Stage Application of International Application No. PCT/IB2013/051441, filed on Feb. 22, 2013, which claims benefit of and priority to Indian Patent Application No, 487/MUM/2012 filed Feb. 22, 2012, The entire contents of all 3 applications are incorporated herein by reference in their entirety.

TECHNICAL FIELD

This disclosure generally pertains to features of assembly and installation of a fluid filter assembly. More particularly, the disclosure herein relates to a mechanism that prevents assembly of a fluid filter assembly if there is no filter cartridge installed, and/or to a mechanism that prevents assembly of a fluid filter assembly if the incorrect filter cartridge is installed.

BACKGROUND OF THE INVENTION

Currently, filtration systems, for example in engines, incorporate mechanisms so that an engine will not run, if a filter cartridge is not assembled with the filter assembly. However, such detection is only after the filter assembly has seemingly been assembled properly and completely. While current filtration technology can prevent an engine from running, it does not ensure complete and proper assembly of the filter assembly at an initial stage, where it is certain that a filter cartridge, and in some cases, the correct filter cartridge has been installed. Thus, further improvements can be made to fluid filter assembly and installation.

SUMMARY OF THE INVENTION

Generally, a mechanism is described that can prevent assembly of a fluid filter assembly if there is no filter cartridge installed and/or a mechanism is described that can prevent assembly of a fluid filter if there is an attempt to install the incorrect filter cartridge. Such a mechanism may be used for example in lube and fuel filtration applications, such as in engines, but may be appropriate in other filtration applications where appropriate.

In one embodiment, a movable member is configured to cooperate with a structure configured to move the movable member. This relationship can help ensure that a fluid filter assembly cannot be completely assembled, for example connecting a filter head to its shell if there is no cartridge installed inside the shell, or in some cases if there is an attempt to install an incorrect cartridge. Such a mechanism can protect from a mechanic inadvertently or intentionally failing to install a cartridge (or correct cartridge) in the filter assembly.

In one embodiment, such a mechanism includes a movable member and a structure that can move the moveable member. The movable member may be a structure that can be movable/can operate for example in a filter head of a fluid filter apparatus. In some embodiments, the movable member is a lever structure that cooperates with a structure that can move the movable member. Such interaction and/or engagement allow for a fluid filter apparatus to be assembled, for example the shell to the filter head.

Generally, the structure that moves the movable member is an anti-blocking structure, for example that allows connection of a filter cartridge and shell to a filter head. When the mechanism is operated, e.g. when the movable member is moved, a shell of the fluid filter assembly and a filter head of the fluid filter assembly can be connected to complete assembly of the fluid filter assembly.

In one embodiment, the structure is on or is a part of an endplate, for example an endplate of a removable and serviceable filter cartridge having filtration media. In one embodiment, the movable member extends inward from an inner wall of a filter head.

In one embodiment, a filter assembly comprises a filter head having a connective structure on an inner wall that surrounds a receiving area. The filter head includes a movable member extending away from the inner wall to block entry into the receiving area. A filter cartridge has a filter media and an endplate. The filter cartridge includes a structure configured to move the movable member back toward the inner wall of the filter head. A shell receives the filter cartridge. The shell includes a connective structure that is configured to connect with the connective structure of the filter head, when the movable member is moved back toward the inner wall by interaction with the structure configured to move the movable member. This configuration can allow clearance for the shell and filter cartridge to be received by the receiving area of the filter head and allow connection with the filter head.

DETAILED DESCRIPTION

Generally, a mechanism is described that can protect a filtration system from an inappropriate and/or incomplete filter installation, for example by preventing assembly of a fluid filter assembly if there is no filter cartridge installed, and/or by preventing assembly of a fluid filter assembly if there is an attempt to install an incorrect filter cartridge. Such a mechanism may be used for example in lube and fuel filtration applications, such as in engines, but may be appropriate in other filtration applications where appropriate. Such a mechanism can protect from a mechanic inadvertently or intentionally failing to install a cartridge (or correct cartridge) in the filter assembly, such that an engine would not run with dirty fuel or oil.

In one embodiment, a mechanism herein includes cooperation of a movable member and a structure configured to move the movable member to ensure that a fluid filter assembly cannot be completely assembled, for example connecting filter head to its shell if there is no cartridge installed inside the shell, or in some cases if the incorrect cartridge is installed in the shell. It will be appreciated that the movable member may be a structure that can be movable/can operate in the filter head, where in some embodiments, the movable member is a lever structure. It will be appreciated however that the movable member can be a structure that is appropriately configured to block an attempt at installing an incorrect filter cartridge or no filter cartridge, and is appropriately configured to allow assembly when a correct filter cartridge is present.

Further, while the movable member is mostly shown as disposed on the inner sidewall of the filter head and the structure that moves the movable member is mostly disposed on or as part of the endplate, it will be appreciated that these specific arrangements are not meant to be limiting, as the movable member and structure configured to move the movable member can be disposed in various arrangements so as to operate the mechanism.

Figure 1A:
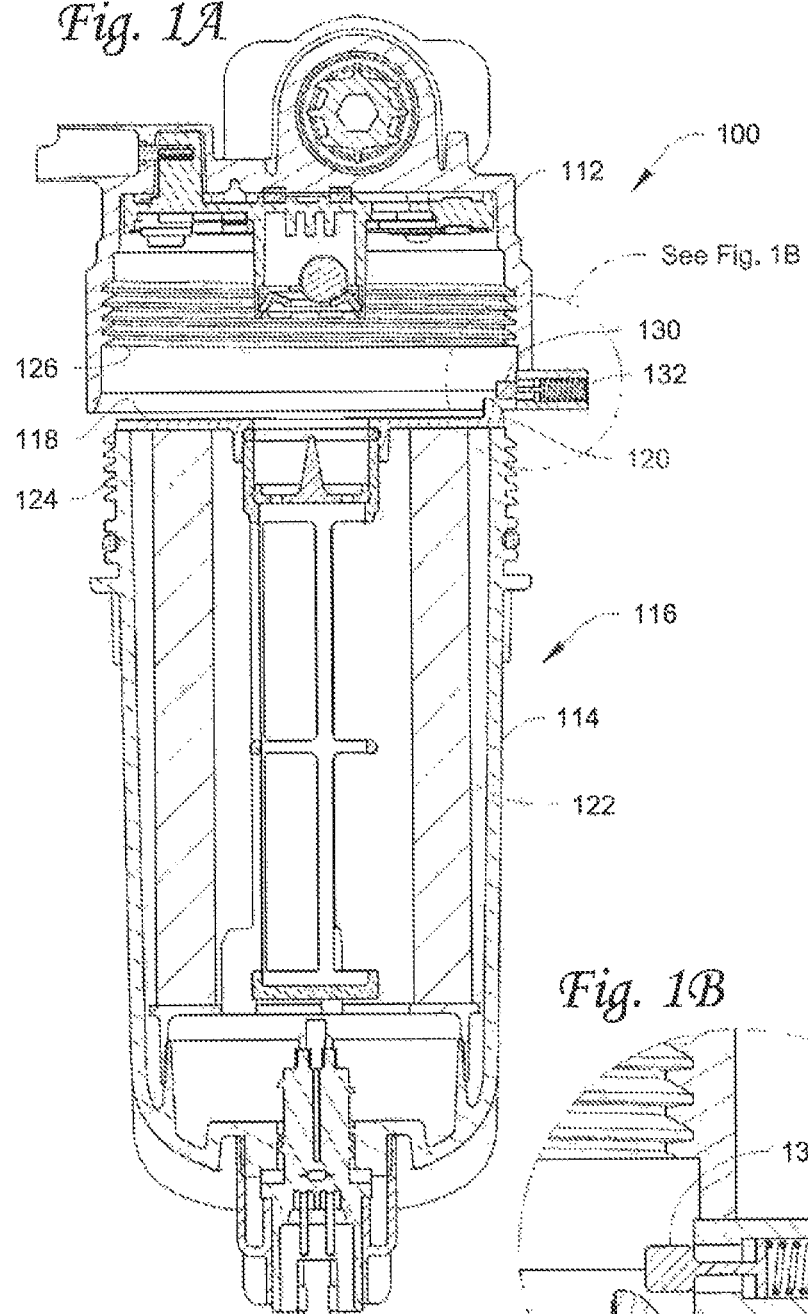
FIG. 1A shows one embodiment of d mechanism that can prevent assembly of a fluid filter assembly without a filter cartridge and/or prevent assembly of the fluid filter assembly when there is an attempt to install an incorrect filter cartridge.
Figure 1B:
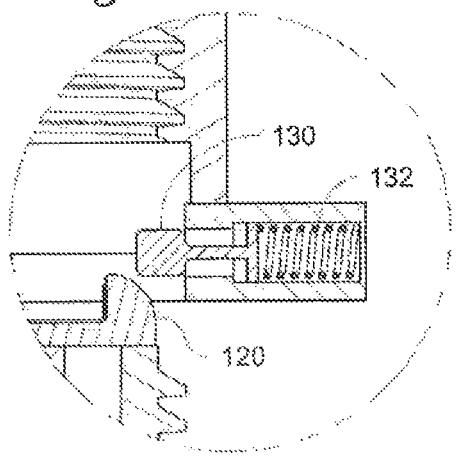
FIG. 1B shows a close-up view of the mechanism of FIG. 1A.

FIGS. 1A and 1B show one embodiment of a mechanism in a fluid filter assembly 100. The mechanism can prevent assembly of the fluid filter assembly without a filter cartridge and/or prevent assembly of the fluid filter assembly with the incorrect filter cartridge installed. Generally, the mechanism has a movable member 130 and a structure 120 that can move the movable member 130, for example when the movable member 130 and the structure 120 that can move it are engaged.

The filter assembly 100 has a filter head 112 that connects with a shell 114, for example through a threaded connection by threads 124, 126. A filter cartridge 116 has a filter media 122 and an endplate 118. In some embodiments, the filter cartridge 116 includes filtration media 122 and can be assembled with a shell 114, where the shell 114 and cartridge 116 can make up a removable and replaceable unit connectable to the filter head 112. In other embodiments, the shell 114 may be reused, where the filter cartridge 116 including the media 122 and endplate 118 are replaceable.

The endplate 118 has the structure 120 that can move the movable member 130 on the filter head 112, when the shell 114 and cartridge 116 are connected with the filter head 112. In one embodiment, the movable member 130 may be configured as a lever, switch, or button that can prevent or allow assembly with the filter head.

In the embodiment shown, the structure 120 is an arcing structure 120 that arcs downward toward the outer edge or perimeter of the endplate 118. In the embodiment shown, the arcing structure 120 can be disposed on a top of the endplate 118, for example a top end plate of the filter cartridge 116.

In the embodiment shown, the movable member 130 can be disposed for example on an inner surface of a filter head, such as filter head 112 of the fluid filter assembly 100. For example, the movable member 130 extends inward from an inner wall of the filter head 112.

FIG. 1B shows the arcing structure 120 and movable member 130 in a close up view. The arcing structure 120 can cooperate with the movable member 130, where the arcing structure 120 is engageable with the movable member 130 so that as the movable member 130 can be moved. In one embodiment, when the movable member 130 is moved, the shell 114 and the filter head 112 can be connected to help complete assembly of the fluid filter assembly 100.

In some embodiments, the shell 114 and filter head 112 may be connected for example by a connective structure, such as by engaging threads 124 on the shell 114 and threads 126 on the filter head 112. It will be appreciated that engaging threads to connect the filter head 112 and shell 114 may not be employed as other options for connecting them may be appropriate and suitable. For example, the shell 114 and filter head 112 may be connected by pushing the shell inside and closing with clamps.

The mechanism design herein is based on a concept for providing safety, for example in the event a cartridge is not assembled with the shell before final assembly of the filter, e.g. installation of the filter head, or when there may be an attempt to install a filter cartridge that is not correct.

With further reference to FIGS. 1A and 1B, the filter cartridge 116 can be assembled inside the shell 114 and they are then moved to be connected to the filter head 112. The shape of the arcing structure 120 on the endplate 118 can engage the movable member 130. The arcing structure 120 can push or press the movable member 130 back toward the inner surface of the filter head 112 and allow for the shell 114 to be connected, such as for example by threaded connection, to the filter head 112 such as by threads 24, 26.

In one embodiment, the movable member 130 is biased so that it is normally extended, i.e. not pressed or pushed back toward the inner surface of the filter head 112. When the arcing structure 120 engages the movable member 130, the movable member 130 can ride along the surface of the arcing structure 120 and be moved or pressed toward the inner surface of the filter head 12. The arcing structure 120 is configured so it can move the movable member 130 from its biased position, biased through biasing component 132, to allow the shell 114 and cartridge 116 to connect with the filter head 112.

In operation, as the shell 114 and filter cartridge 116 assembly moves upward, the movable member 130 is kept pressed or moved back by the arcing structure 120, so that the shell 114 can then connect to the filter head 112. In one embodiment, the features of the shell 114, which includes the threaded portion 124, can also help maintain the movable member 130 back in the clearance position. For example, in one embodiment the width of the movable member 130 is kept greater than the pitch of the thread 124 so that the shell 114 can have a smooth entry. Seals such as an o-ring(s) can be repositioned as needed so that appropriate and/or necessary fluid seals are maintained.

Figure 2A:
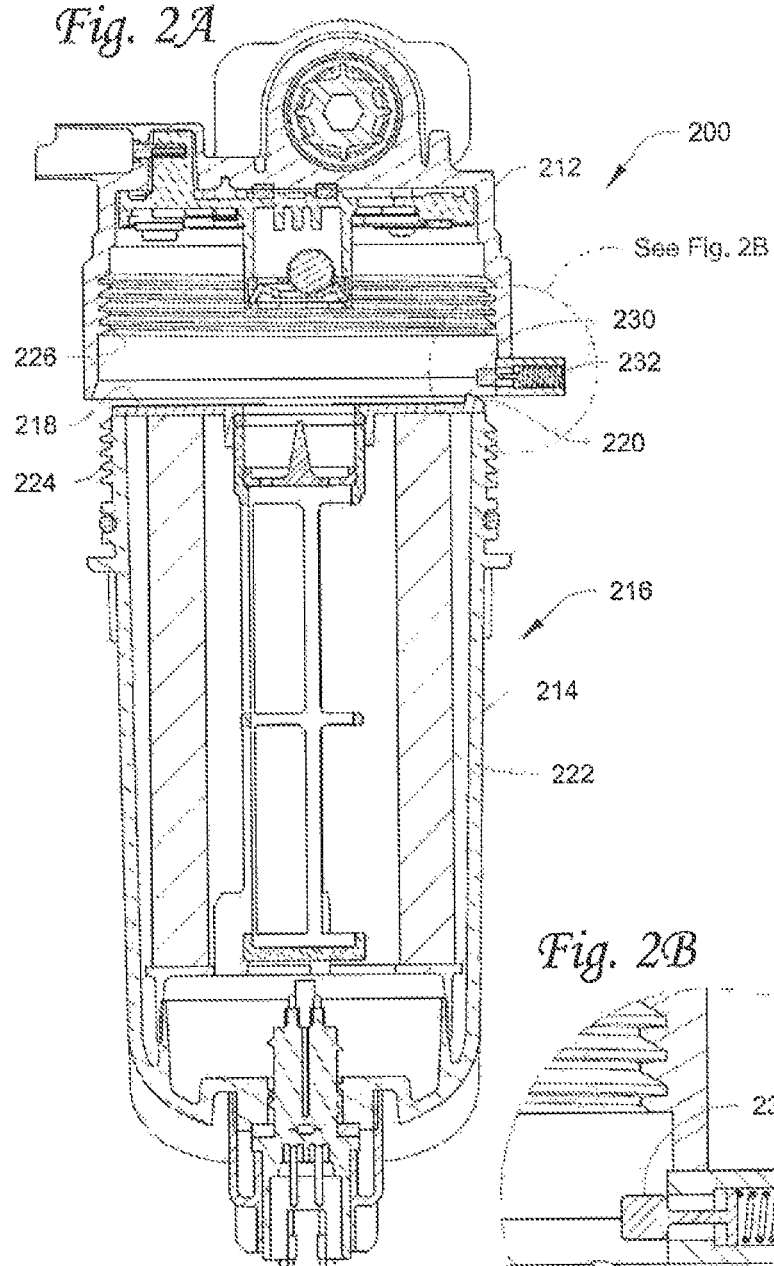
FIG. 2A shows another embodiment of a mechanism that can prevent assembly of a fluid filter assembly without a filter cartridge and/or prevent assembly of the fluid filter assembly when there is an attempt to install an incorrect filter cartridge.
Figure 2B:
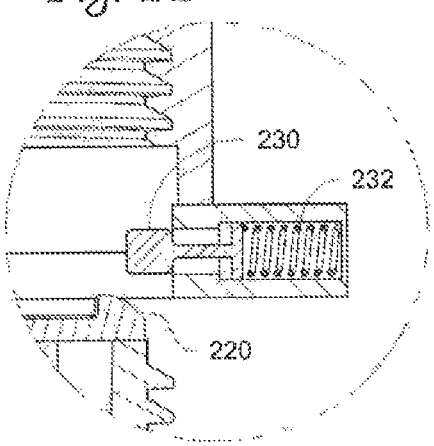
FIG. 2B shows a close-up view of the mechanism of FIG. 2A.

FIGS. 2A and 2B show another embodiment of a mechanism in a fluid filter assembly 200. The mechanism can prevent assembly of the fluid filter assembly without a filter cartridge and/or prevent assembly of the fluid filter assembly with the incorrect filter cartridge installed. Generally, the mechanism has a movable member 230 and a structure 220 that can move the movable member 230, for example when the movable member 230 and the structure 220 that can move it are engaged. The basic structure and operation of the mechanism is similar to FIGS. 1A and 1B, but the structure 220 that moves the movable member is configured differently than arcing structure 120.

The filter assembly 200 has a filter head 212 that connects with a shell 214, for example through a threaded connection by threads 224, 226. A filter cartridge 216 has a filter media 222 and an endplate 218. The endplate 218 has a structure 220 that can move the movable member 230 on the filter head 212, when the shell 214 and cartridge 216 are connected with the filter head 212. In the embodiment shown, the structure 220 is a curved structure 220 that curves downward toward the outer edge or perimeter of the endplate 218. The curved structure 220 can move the movable member 230 from its biased position, biased through biasing component 232, to allow the shell 214 and cartridge 216 to connect with the filter head 212. FIG. 2B shows a close up view of the curved structure 220 and movable member 230.

Figure 3A:
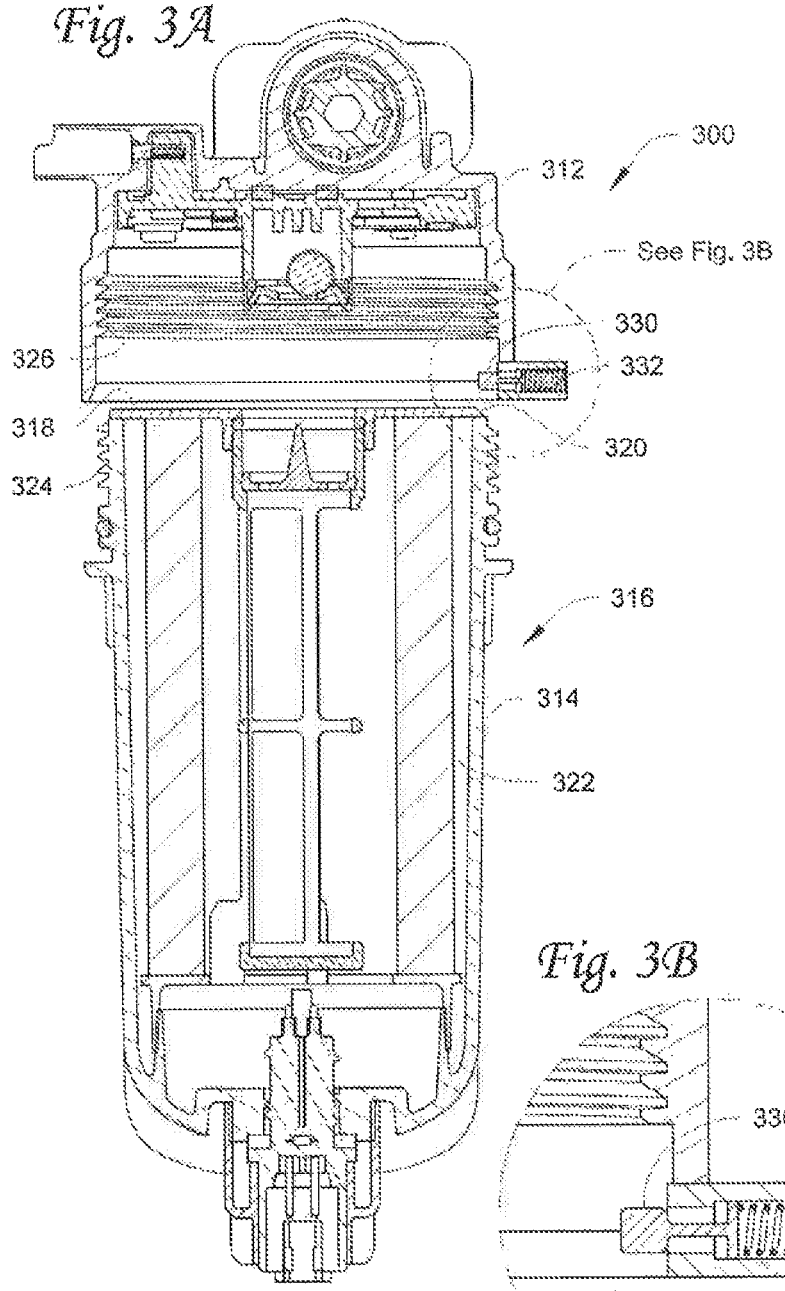
FIG. 3A shows another embodiment of a mechanism that can prevent assembly of a fluid filter assembly without a filter cartridge and/or prevent assembly of the fluid filter assembly when there is an attempt to install an incorrect filter cartridge.
Figure 3B:
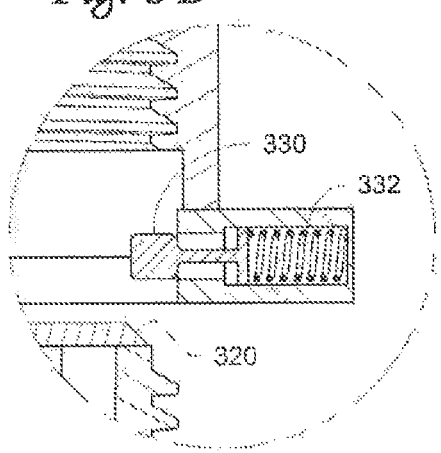
FIG. 3B shows a close-up view of the mechanism of FIG. 3A.

FIGS. 3A and 3B show another embodiment of a mechanism in a fluid filter assembly 300. The mechanism can prevent assembly of the fluid filter assembly without a filter cartridge and/or prevent assembly of the fluid filter assembly with the incorrect filter cartridge installed. Generally, the mechanism has a movable member 330 and a structure 320 that can move the movable member 330, for example when the movable member 330 and the structure 320 that can move it are engaged. The basic structure and operation of the mechanism is similar to FIGS. 1A to 2B above, but the structure 320 that moves the movable member is configured differently.

The filter assembly 300 has a filter head 312 that connects with a shell 314, for example through a threaded connection by threads 324, 326. A filter cartridge 316 has a filter media 322 and an endplate 318. The endplate 318 has a structure 320 that can move the movable member 330 on the filter head 312, when the shell 314 and cartridge 316 are connected with the filter head 312. In the embodiment shown, the structure 320 is a tapered structure 320 that tapers downward toward the outer edge or perimeter of the endplate 318. As shown, the tapered structure 320 does not protrude upward from the top surface of the endplate 318. Rather, the endplate 318 includes a ramp constructed at the outer edge of the endplate 318. For example, the endplate 318 has the tapered structure 320 ramping downward into the endplate and away from the top surface of the endplate. The tapered structure 320 may be for example a cutout from an edge of the endplate 318. As shown, the tapered structure 320 can move the movable member 330 from its biased position, biased through biasing component 332, to allow the shell 314 and cartridge 316 to connect with the filter head 312. FIG. 3B shows a close up of the tapered structure 320 and movable member 330.

With further reference to FIGS. 1A to 3B, certain fluid filter valve features are shown, however, it will be appreciated that such valve structures shown may not necessarily be required for use with the protection mechanism described herein, but represent one example of the type of fluid filter assembly with which the protection mechanism may be employed.

With further reference to the mechanism of the movable member and the structure configured to move the movable member, other embodiments may be employed. In other embodiments, for example, the mechanism can include magnets incorporated as one or more parts of the movable member and structure to move the movable member. For example, magnets of the same polarity may be employed. For example a magnet of one polarity may be employed within the movable members, such as described above. Likewise, another magnet of the same polarity may be employed within the structure configured to move the movable member, such that when in proximity with the movable member, the magnets would repel each other to help move the movable member. The movable member would thus be moved to allow clearance for example of a filter cartridge and shell to connect with a filter head. It will be appreciated that such a magnet configuration can be implemented into any of the embodiments of FIGS. 1A-3B. It will also be appreciated that the magnet configuration may alone be implemented as the movable member and structure that can move it, without the need of the tapered, arcing, or curved structures, or movable members 130, 230, or 330 illustrated.

With further reference to the relative cooperation of the mechanism components, the movable member 130, 230, 330 can engage the structure 120, 220, 320 and ride along the surface of the structure 120, 220, 320. This can press the movable member 130, 230, 330 back toward the inner surface of the filter head 112, 212, 312. In some embodiments, a spring load is used as a biasing component 132, 232, 332 to bias the movable member 130, 230, 330 outward from the inner surface of the filter head 112, 212, 312. The movable member 130, 230, 330 can then be pushed or pressed back such that there is enough clearance for the shell 114, 214, 314 to enter and be connected to the filter head 112, 212, 312. For example, the movable member 130, 230, 330 is kept in the unbiased position as long as the shell 114, 214, 314 is connected to the filter head 112, 212, 312.

However, in a situation where there is no filter cartridge in a shell, the movable member, for example on the filter head, has a surface that would block a surface of the shell, e.g. rim at the top, and will not allow the shell to enter the inside to connect with the filter head.

Figure 4:
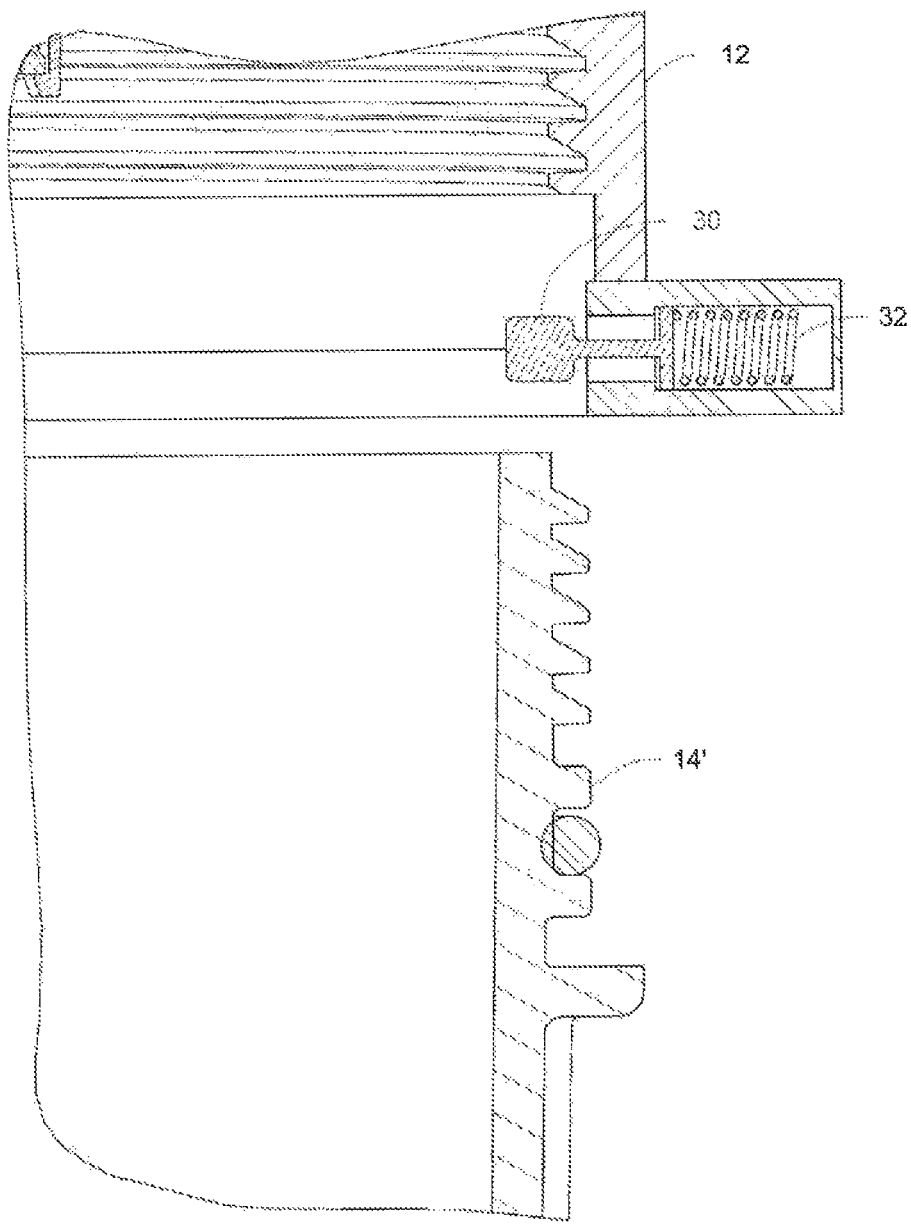
FIG. 4 shows prevention of assembling a fluid filter assembly, particularly assembly of a filter head with a filter shell when no cartridge is installed.

FIG. 4 shows prevention of assembling the fluid filter assembly, particularly assembly of the filter head 12 with a filter shell 14', when no cartridge is installed. As shown, when no filter cartridge is in the shell 14', the movable member (depicted as 30 in FIG. 4) has a flat surface for example that blocks the shell 14' for example its flat surface, and will not allow it to go further inside the filter head 12. For example the flat surfaces of the shell 14' and movable member 30 would abut such that the biasing component 32 would not move out of its biased position.

In a situation where the incorrect filter cartridge is assembled with a shell, the movable member would block further entry of the shell inside to connect with the filter head, unless a suitable structure is used such as structure 120, 220, 320 shown and described above, to move the movable member and allow the needed clearance.

Figure 5:
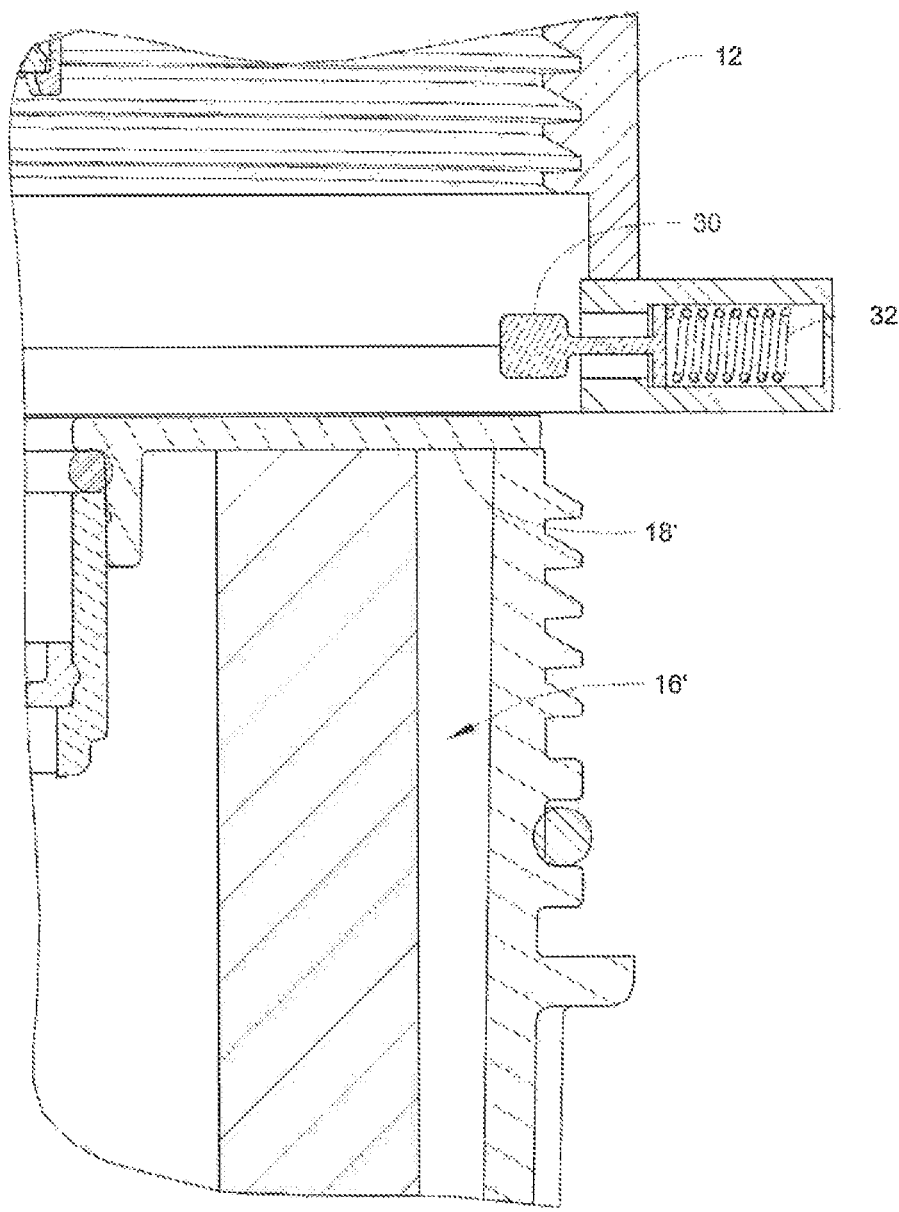
FIG. 5 shows prevention of assembling the fluid filter assembly, particularly assembly of a filter head with a filter shell when the incorrect cartridge is installed.

FIG. 5 shows prevention of assembling the fluid filter assembly, particularly assembly of the filter head 12 with a filter shell when the incorrect cartridge 16' is installed. As shown, where an incorrect filter cartridge 16' is in the shell (i.e. endplate without structure 20), again the lever 30 blocks the shell from entering inside to connect with the filter head 12. For example, the flat surface of the endplate 18' of the incorrect filter cartridge 16' and the flat surface of the lever 30 would abut such that the biasing component 32 would not move out of its biased position. Such a configuration can have an after-market value as the correct cartridge must be used.

As discussed above, the mechanism is not necessarily limited to a movable member being disposed on the inner sidewall of a filter head and not necessarily limited to the structure that moves the movable member being disposed toward the outer rim of the endplate. It will be appreciate that the specific arrangement is not meant to be limiting, as the movable member and structure configured to move it can be disposed in various arrangements so as to operate the mechanism.

Figure 6:
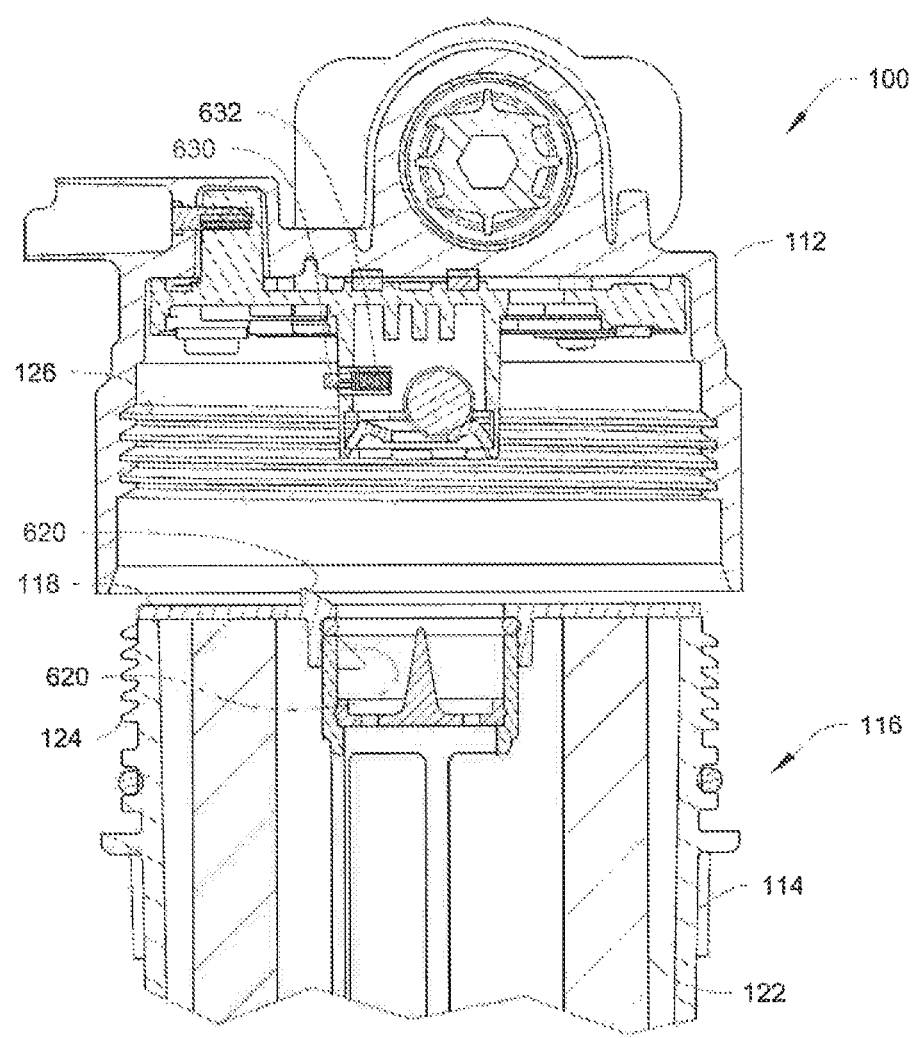
FIG. 6 shows yet another embodiment of a mechanism that can prevent assembly of a fluid filter assembly without a filter cartridge and/or prevent assembly of the fluid filter assembly when there is an attempt to install an incorrect filter cartridge.

FIG. 6 show examples of such other embodiments with similar references to fluid filter assembly 100, which are not further described. As one example, in another embodiment the structure 620 that cooperates with the movable member 630 and biasing member 630 in the filter head 112 can be a protrusion, such as a tapered structure, on a center tube of the filter cartridge 116, while the movable member 630 (see dashed lines of ramp) is disposed for example on a spud of the filter head 112. In another example, the structure 620 that operates with the movable member 630 can a structure, such as a tapered structure, disposed proximate an inner edge of the endplate 118, such that it ramps downward away from a top surface of the endplate 118 and toward a center of the endplate 118.

In such examples, the structure configured to move the movable member could be disposed on the inner wall of the center tube. The movable member could be disposed on and extend out from the outer wall of the spud of a filter head, such that it may extend toward the receiving area of the filter head somewhat similar to the configuration described above, but on the spud. Likewise, such a movable member can be operated with a biasing component, e.g. biasing component 632. In one embodiment, the structure 620 may be a protrusion or extension disposed on the center tube proximate an end that the filter cartridge engages the filter head, where the structure 620 can create a ramp toward the endplate 118 or toward a center of the endplate. Accordingly, the movable member 630 and the biasing member 632 can be disposed on the outer wall of the spud to engage the structure 620 (either on the center tube or on a radially inner part of the endplate). It will be appreciated that such an arrangement can also be suitable for the center tube and spud of the assemblies shown in the embodiments illustrated by FIGS. 1A to 3B.

With the mechanism proposed, a fluid filter assembly can be assembled properly and completely at the initial stage. The concepts herein can help fool-proof and protect an engine and also provide the following:

1. Can add more value to a customer as the assembly problem is initially observed right at the start.
2. In some cases, a pressure drop in the system can be avoided as certain valve structure(s) may not be required in outlet of fuel filter.
3. Can reduce cost by requiring less parts than some current technologies.
4. Can reduce service cost of reopening the engine in the event a cartridge is missed (or incorrect cartridge installed).
5. Can provided added service/user friendly features.
6. Can be applicable to various filtration applications as appropriate, for example fuel and lube filtration applications.
7. Can have aftermarket protection by having specific geometry of an endplate.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

I claim:

1. A filter assembly comprising:
a filter cartridge comprising:
a filter media defining a generally longitudinal axis and having an upper axial end and a lower axial end; and
an upper endplate coupled to the upper axial end of the filter media, the upper endplate including an upper endplate surface extending perpendicular to the longitudinal axis, a radially outer endplate surface extending along a radial outer periphery of the endplate, and an intermediate endplate surface extending radially between the upper endplate surface and the radially outer endplate surface, the intermediate endplate surface comprising a curved surface which extends downward to the radially outer endplate surface from a vertical surface extending axially above the upper endplate surface, the curved surface configured to, when the filter cartridge is assembled with a filter head, move a movable member disposed in the filter head in a direction perpendicular to the longitudinal axis so as to allow the filter cartridge to be assembled with the filter head; and
a shell that receives the filter cartridge, the shell including a connective structure that is configured to connect with connective structure of the filter head, when the movable member is moved, so as to allow the filter cartridge to be assembled with the filter head, and so as to allow clearance for the shell and filter cartridge to be received in the filter head and allow connection with the filter head.

2. The filter assembly of claim 1, wherein the intermediate endplate surface is associated with a magnetic material, the magnetic material possessing the same polarity as magnetic material associated with the movable member so as to assist in the movement of the movable member.

3. The filter assembly of claim 1, wherein the connective structure of the shell comprises a plurality of threads formed on a radially outer surface of the shell, the plurality of threads configured to engage corresponding threads on the filter head.

4. The filter assembly of claim 1, wherein the filter cartridge and the shell are assembled as a single replaceable unit.

5. The filter assembly of claim 1, wherein the filter cartridge is a replaceable component which is removable from the shell, and wherein the shell is reusable.

6. A filter assembly comprising:
a filter cartridge comprising:
a filter media defining a generally longitudinal axis and having an upper axial end and a lower axial end; and
an upper endplate coupled to the upper axial end of the filter media, the upper endplate including an upper endplate surface extending perpendicular to the longitudinal axis, a radially inner endplate surface extending along an inner radial periphery of the endplate a vertical endplate surface extending axially away from the upper endplate surface, and an intermediate endplate surface extending radially between the upper endplate surface and the radially inner endplate surface, the intermediate endplate surface comprising a planar, tapered surface extending downward from an uppermost portion of the vertical endplate surface to the radially inner endplate surface, the planar, tapered surface configured to, when the filter cartridge is assembled with a filter head, move a movable member disposed on a spud of the filter head in a direction perpendicular to the longitudinal axis so as to allow the filter cartridge to be assembled with the filter head; and a shell that receives the filter cartridge, the shell including a connective structure that is configured to connect with connective structure of the filter head, when the movable member is moved, so as to allow the filter cartridge to be assembled with the filter head, and so as to allow clearance for the shell and filter cartridge to be received in the filter head and allow connection with the filter head.

7. The filter assembly of claim 6, wherein the connective structure of the shell comprises a plurality of threads formed on a radially outer surface of the shell, the plurality of threads configured to engage corresponding threads on the filter head.

8. The filter assembly of claim 6, wherein the filter cartridge and the shell are assembled as a single replaceable unit.

9. The filter assembly of claim 6, wherein the filter cartridge is a replaceable component which is removable from the shell, and wherein the shell is reusable.

10. The filter assembly of claim 6, wherein the intermediate endplate surface is associated with a magnetic material, the magnetic material possessing the same polarity as magnetic material associated with the movable member so as to assist in the movement of the movable member.

\* \* \* \* \*